United States Patent [19]

Szumierz et al.

[11] Patent Number: 4,754,865

[45] Date of Patent: Jul. 5, 1988

[54] CONNECTOR TRANSFER SYSTEM

[75] Inventors: Anthony Szumierz, Addison; Frank Chmela, Downers Grove; Maurice Godfrey, Westchester; Gerald O'Connell, Lisle, all of Ill.

[73] Assignee: Molex Incorporated, Lisle, Ill.

[21] Appl. No.: 52,438

[22] Filed: May 21, 1987

[51] Int. Cl.[4] .............................................. B65G 47/26

[52] U.S. Cl. .................................... 198/429; 198/459; 29/747

[58] Field of Search .................. 198/463.4, 463.5, 459, 198/429, 425, 456, 468.3, 436; 29/747, 759; 414/330

[56] References Cited

U.S. PATENT DOCUMENTS 4,235,015 11/1980 Funick et al. ......................... 29/857
4,492,023 1/1985 Schneider et al. ................ 29/749 X
4,660,279 4/1987 Szumierz et al. ............... 414/750 X
4,694,951 9/1987 Gibbemeyer .................. 198/459 X

*Primary Examiner*—Robert J. Spar
*Assistant Examiner*—Cheryl L. Gastineau
*Attorney, Agent, or Firm*—John W. Cornell; Louis A. Hecht

[57] ABSTRACT

A harness making machine includes a transfer system receiving electrical connectors in abutting relation and separates the connectors while moving them from a feed track to a delivery track. The separation provides uniform spacing between terminals for termination of more than one connector in a cycle of machine operation. The feed and delivery tracks are unobstructed, and a pawl carried by a transfer carriage separates the connectors in response to movement of the carriage from the feed track to the delivery track. A shuttle moves the spaced connectors into a nest and the nest is moved to a termination station.

10 Claims, 3 Drawing Sheets

CONNECTOR TRANSFER SYSTEM

FIELD OF THE INVENTION

The present invention relates to harness making machines and more particularly to a connector transfer system for delivering nonstackable connectors in a spaced apart orientation with their terminals on predetermined centerlines.

DESCRIPTION OF THE PRIOR ART

Automatic harness making machines are used for manufacture of wiring harnesses including a number of electrical conductors terminated to a series of electrical terminals supported by a connector housing. In a typical harness making machine, connectors are supplied to a feed track from a vibratory bowl, a cassette or package or other conventional source. From the feed track, a connector is transferred to a delivery track and then to a termination station where conductors are terminated, i.e., electrically and mechanically attached to terminals of the connector. Often the terminals are of the insulation displacement type and the termination is accomplished by a conductor insertion apparatus having spaced blades in a comb like array moving to insert the conductors into the terminals in a mass termination operation. However, other terminals used with other termination equipment can also be used with harness making machines of various types. One example of a harness making machine is shown in U.S. Pat. No. 4,235,015, incorporated herein by reference.

Known automatic harness making machines may be used to terminate several conductors to a single connector having a relatively large number of terminals arranged in a line with their centers spaced apart by a uniform distance. For example, one widely used harness making machine accepts a twenty-four circuit connector having insulation displacement terminals spaced on 0.100 inch centerlines. In this machine, the conductor insertion blades at the termination station are also on 0.100 inch centers to register with the terminals.

Frequently the need arises to make harnesses having smaller connectors with fewer terminals and fewer conductors. It is not efficient to make only a single small harness in a single operation of the machine. When harnesses having relatively few conductors and relatively small connectors are made, it is desirable to make more than a single harness during each cycle of operation of the machine. This is accomplished by loading more than one connector into the termination station and terminating more than one connector in one mass termination operation.

Some connectors, known as "stackable" connectors, can be stacked end-to-end with the predetermined terminal centerline spacing preserved. Stackable connectors are held end-to-end at the termination station, and the termination operation is carried out in the same way as with a single, larger connector.

Other connectors, when stacked end-to-end, do not preserve the desired regular spacing of terminals. These connectors, known as "nonstackable", cannot be terminated in end-to-end relationship with normal termination equipment because the spacing of the termination equipment does not match the spacing of the terminals of the adjacent connectors.

This difficulty has been overcome by holding adjacent connectors at the termination station in a spaced apart relationship. The space between two connectors is selected so that the centerline spacing of the terminals of both connectors matches that of the termination equipment. To achieve the desired spacing, connector transfer systems have been employed for receiving connectors stacked end-to-end in a feed track and delivering the connectors to the termination station in the desired spaced apart relation.

U.S. patent application Ser. No. 787,349 filed Oct. 15, 1985, now U.S. Pat. No. 4,653,183, discloses a harness making machine in which connectors are spaced apart by pins or pawls inserted between adjacent connectors to engage ends of the connectors. U.S. patent application Ser. No. 737,848 filed May 24, 1985, now U.S. Pat. No. 4,660,279, discloses a harness making machine in which pawls engage structure of the connectors other than the ends. In both arrangements, the pawls or pins engage the connectors and separate the connectors as the connectors are moved along a delivery track to the termination station. Although successful for their intended purposes, other re-spacing delivery systems and particularly those suited for relatively small runs of different connector sizes are still needed.

SUMMARY OF THE INVENTION

A principal object of this invention is to provide a connector transfer system for nonstackable connectors capable of easily being set up for different connector sizes and combinations; to provide a system in which the connector spacing is accomplished during movement from a feed track to a delivery track rather than during movement along the delivery track; to provide a system in which a very simple mechanism accurately spaces apart connectors of many sizes; to provide a system in which movement of connectors in both the feed track and the delivery track is free and unimpeded; and to provide a connector transfer system for automatic harness making machines overcoming disadvantages of those used in the past.

In brief, the above and other objects and advantages of the invention are achieved by providing an improved connector transfer system for a harness making machine having a connector feed track in which connectors are supplied in abutting end-to-end relation and a delivery track from which a pair of connectors are fed with their ends spaced apart by a predetermined distance. The connector transfer system includes a carriage member having a connector transfer track for slideably receiving connectors. The carriage member is moved alternately to a load position with the transfer track in alignment with the connector feed track and to a discharge position wherein the transfer track is aligned with the delivery track. A pawl is carried by the carriage member adjacent the transfer track. A cam and follower operate in response to movement of the carriage member from the load position to the discharge position for moving the pawl into engagement with one of the pair of connectors and for moving the one connector a predetermined distance along the transfer track.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
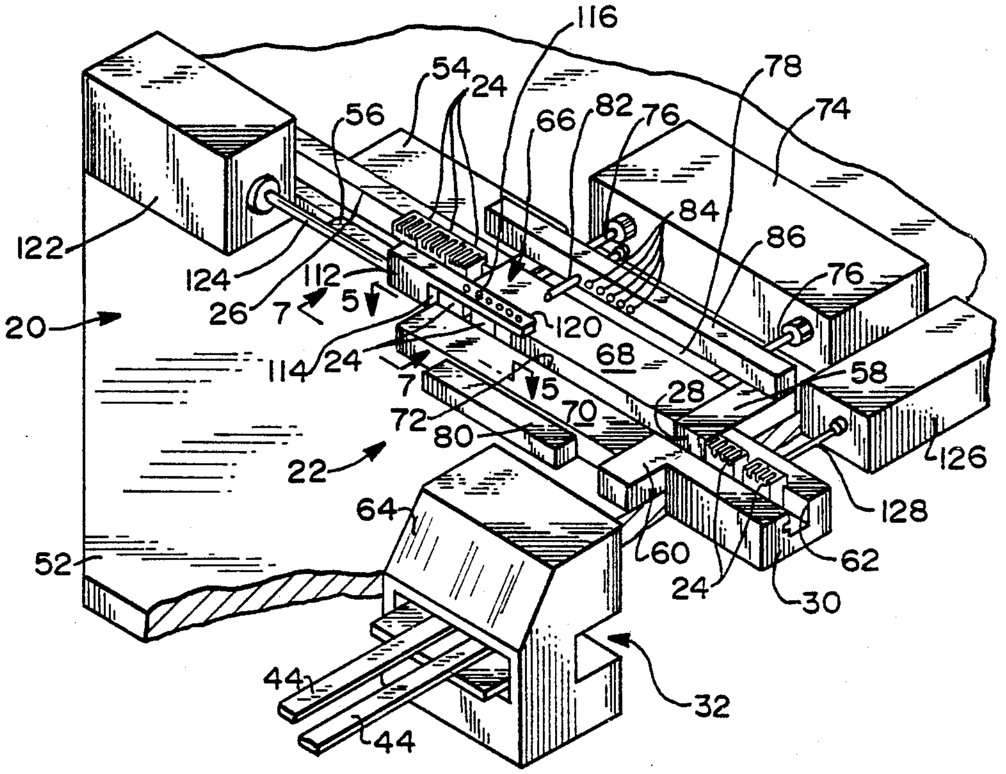
FIG. 1 is a fragmentary, diagrammatic, perspective view of parts of a harness making machine including a connector transfer system embodying the present invention.

Referring now to the drawings, in FIG. 1 there is illustrated in schematic and diagrammatic form an automatic harness making machine generally designated as 20. The machine 20 is provided with a connector transfer system generally designated as 22 constructed in accordance with the principles of the present invention. In general, the transfer system 22 accepts electrical connectors 24 stacked end-to-end from a feed track 26 of the machine 20. In accordance with the invention, the transfer system 22 delivers the connectors 24 in accurately spaced apart relationship to a delivery track 28 including a connector nest 30 movable to a termination station generally designated as 32.

Figure 2:
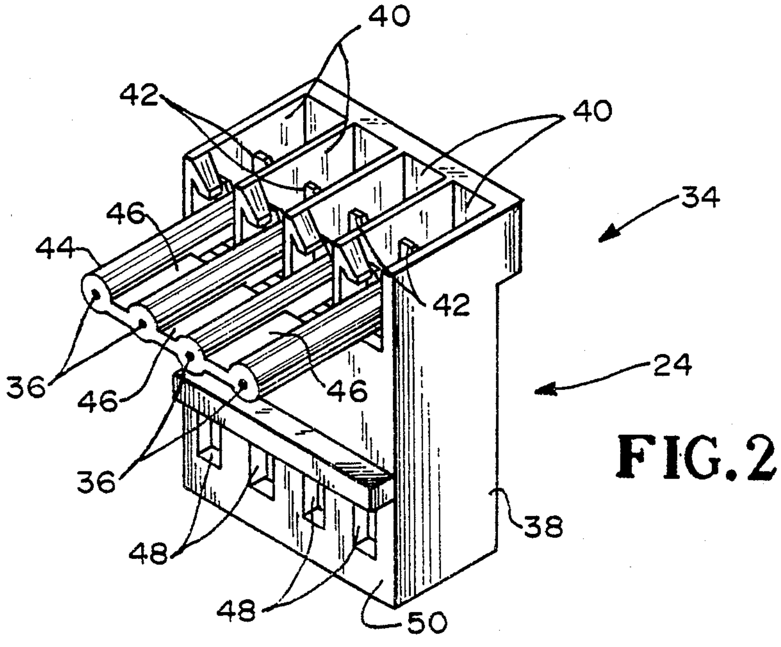
FIG. 2 is a perspective view of part of a wiring harness made with the machine of FIG. 1.
Figure 3:
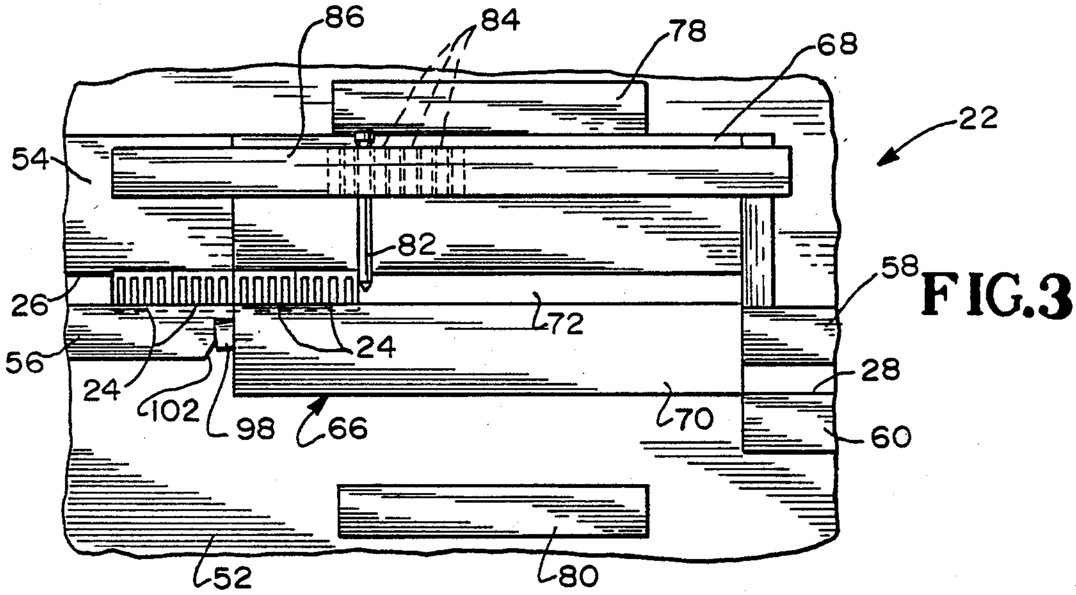
FIG. 3 is a top plan view of the connector transfer system of FIG. 1 shown in the load position.

The principles of the present invention are applicable to the manufacture of wiring harnesses of many different characters using automatic harness making machines of many different types. The machine 20 illustrated in FIG. 1 is used to fabricate the harness generally designated as 34, illustrated in FIG. 2, including one electrical connector 24 and four electrical conductors 36.

More specifically, connector 24 includes a housing 38 defining four cavities 40. An insulation displacement type electrical terminal 42 is mounted in each cavity 40. One conductor 36 is terminated to each terminal 42. Termination is accomplished by moving the conductors down into cavities 40 so that the conductors enter insulation displacement slots in the terminals 42. In the illustrated arrangement, conductors 36 are components of a ribbon cable 44 including bridging portions 46. Many other alternatives are possible, including the use of discrete wires in place of ribbon cable, the use of terminals of many different types and the use of connectors having more or fewer recesses and terminals. The housing 38 includes an opening 48 in one sidewall 50 communicating with each cavity. With the specific connector 24, openings 48 cooperate with locking tangs of the terminals 42.

Because details of the harness making machine 20 are not necessary to an understanding of the present invention, the machine 20 is illustrated in fragmentary and diagrammatic form in FIG. 1. For purposes of illustration, it is shown as including a frame or support 52 upon which the feed track 26 is defined between a pair of track elements 54 and 56 shaped and positioned to permit free sliding movement of connectors 24 along the feed track 26. Connectors 24 are supplied to the feed track 26 and are urged along the feed track toward the transfer system 22 in any conventional manner. The delivery track 28 is defined in part between a pair of track elements 58 and 60 carried by the support 52 and having a shape and position permitting free sliding movement of connectors 24 therealong toward the connector nest 30. Part of delivery track 28 is provided by a connector receiving channel 62 defined in the connector nest 30.

Termination station 32 is associated with a housing 64. Cables 44 are supplied to the termination station 32 from any suitable source, such as supply spools or reels. A cable notching and cutoff assembly enclosed in the housing 64 conditions the ends of conductors 36 for termination at the termination station 32. The ends of the conductors 36 are terminated to the terminals 42 by termination equipment (not shown) including insertion blades engageable with each conductor 36 for pushing the conductors into the connector housing cavities 40 and into the insulation displacement slots of terminals 42. Reference may be had to the above identified U.S. Pat. No. 4,235,015 for a further description of the machine 20 beyond that helpful to an understanding of the present invention.

Connectors 24 are supplied with their ends in contact along the feed track 26. In this orientation, the spacing between the end terminals 42 of two adjacent connectors is larger than the spacing between adjacent terminals 42 of one connector. Since the spacing is not uniform, i.e., not equal to the terminal centerline spacing or integral multiples thereof, two connectors 24 cannot be terminated at the termination station 32 in end-to-end relationship because the insertion blades would not be aligned with the terminals 42 of both connectors 24.

Transfer system 22 of this invention serves reliably and accurately to establish a space between a pair of connectors 24 while the connectors are moved from the feed track 26 to the delivery track 28. The added space is equal to the distance by which the terminals of end-to-end connectors are out of alignment with the insertion blade centerline spacing. The added space assures that all of the terminals 42 of both connectors 24 are aligned with insertion blades of the termination equipment. As a result, a pair of harnesses 34 can be made during each cycle of operation of the harness making machine 20.

Figure 4:
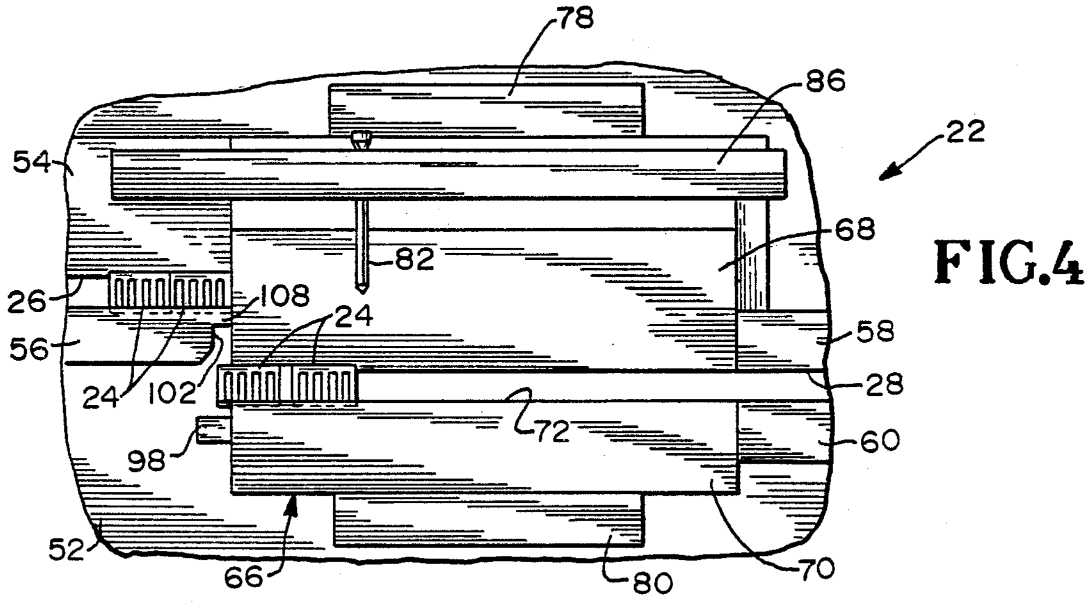
FIG. 4 is a view similar to FIG. 3 showing the connector transfer system in the discharge position.
Figure 5:
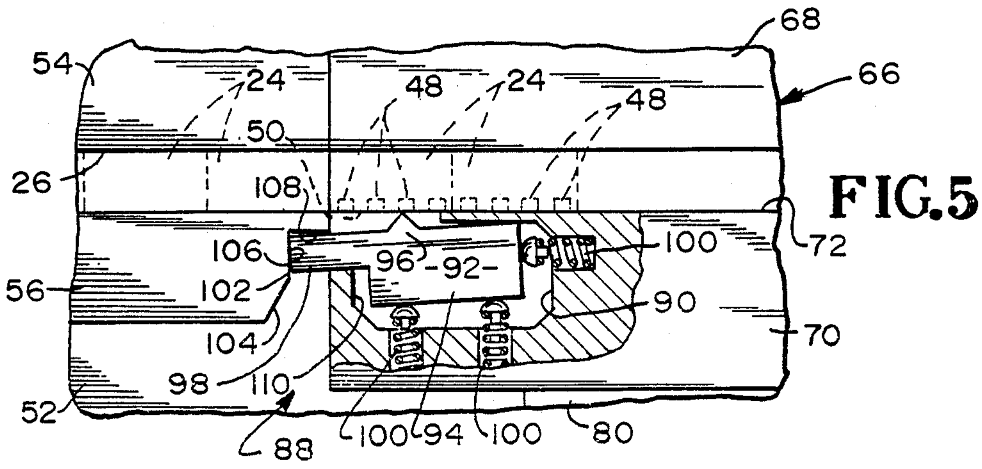
FIG. 5 is an enlarged view similar to part of FIG. 3, partly in section along the line 5—5 of FIG. 1, showing the separator pawl in the load position.
Figure 6:
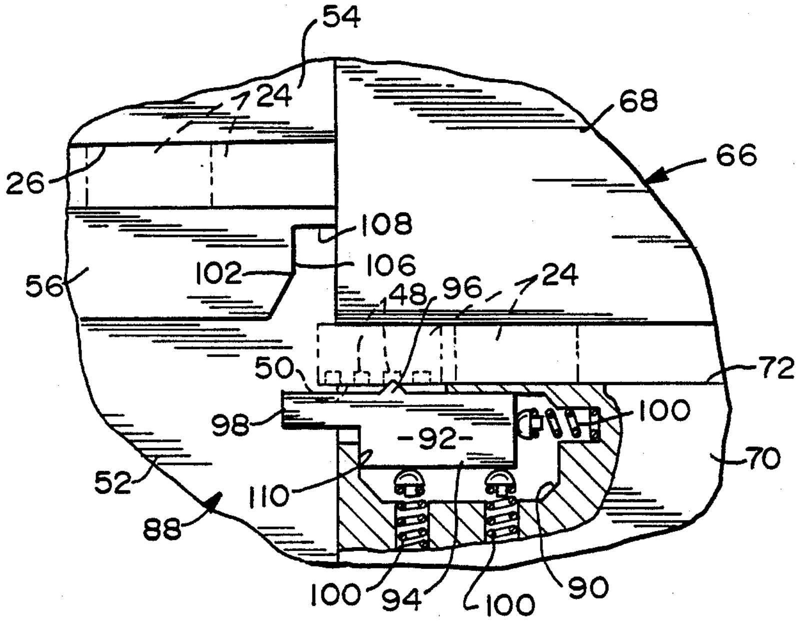
FIG. 6 is a view similar to FIG. 5 showing the separator pawl in the discharge position.

Transfer system 22, best illustrated in FIGS. 3-6, includes a transfer carriage 66 movably mounted on the frame 52 and having a pair of relatively fixed, spaced apart carriage members 68 and 70 defining therebetween a transfer track 72 slideably receiving connectors 24. A carriage drive unit 74, operated pneumatically or otherwise, includes drive arms 76 connected to the carriage 66. The carriage is movable between a feed position (FIGS. 3 and 5) and a discharge position (FIGS. 1, 4 and 6). In the feed position, the transfer track 72 is aligned with the feed track 26, while in the discharge position, the transfer track 72 is aligned with the delivery track 28. A pair of stop members 78 and 80 fixed to the frame 52 are engaged by the transfer carriage 66 accurately to position the carriage 66 in its two alternate positions.

When the transfer carriage 66 moves to the load position (FIG. 3), connectors 24 supplied from the feed track 26 enter the transfer track 72. A stop pin 82 limits sliding movement of connectors 24 so that the first and second connectors 24 enter the transfer track 72 while the third and subsequent connectors remain in the feed track 26. Pin 82 is mounted in a selected one of a number of pin receiving openings 84 provided in a pin mounting member 86 fixed with respect to the frame 52 and mounted above the path of movement of the carriage 66. Pin 82 can easily be mounted in a selected one of the openings 84 to accommodate a pair of connectors 24 of any desired length or lengths.

After loading of a pair of connectors 24 into the transfer track 72 of the carriage 66, the carriage drive unit 74 is operated to move the transfer carriage 60 transversely relative to the direction of the track 28 from the load position against the stop 78 to the discharge position against the stop 80. In accordance with an important feature of the invention, during this movement, the connectors in the transfer track 72 are separated to provide an accurately sized space between adjacent connectors 24.

As shown in FIGS. 5 and 6, the transfer carriage 66 is provided with a separator pawl assembly generally designated as 88. Carriage member 70 includes a recess 90 within which is movably mounted a pawl member 92 having a body portion 94, a protruding pawl projection 96 and an actuator arm 98. Pawl springs 100 bias the pawl member 92 within the recess 90 toward a released or home position shown in FIG. 6. Alternately, the pawl member is movable to a cocked position shown in FIG. 5 by engagement of the arm 98 with a cam structure 102. Cam structure 102 is defined on an end of the delivery track member 56 and includes an inclined cam portion 104, a second cam portion 106 and an abutment 108. The arm 98 operates as a cam follower when it engages the cam structure 102.

In the load position of FIG. 5, actuator arm 98 of the pawl member 92 engages the cam surface 106 of the cam structure 102 as well as the abutment 108. This engagement holds the pawl member 92 in the cocked position illustrated in FIG. 5 with the pawl projection 96 retracted within recess 90. Since the track 72 is unimpeded, connectors 24 can slide freely into the carriage 66.

As the transfer carriage 66 moves away from the load position, actuator arm 98 moves away from the abutment 108 and cam surface 106 across the inclined second cam surface 104. As the arm 98 clears the abutment 108, the pawl member 92 rotates slightly and the pawl projection 96 moves into the track 72 and into engagement with one of the recesses 48 in the housing sidewall 50 of the adjacent connector 24. As the arm 98 leaves the surface 106 and traverses the surface 104, the body 94 moves (to the left as shown in the drawings) until it engages an abutment wall 110 of recess 90. As can be seen by comparing FIGS. 5 and 6, this movement while pawl projection 96 engages recess 48 causes the second or upstream connector 24 to be moved away from the first or downstream connector. The amount of movement is established by the length of the actuator arm 98 and the location of abutments 108 and 110 and is calibrated to provide a space between adjacent connectors equal to the distance required to establish uniform centerline spacing between terminals of the connectors 24.

Figure 7:
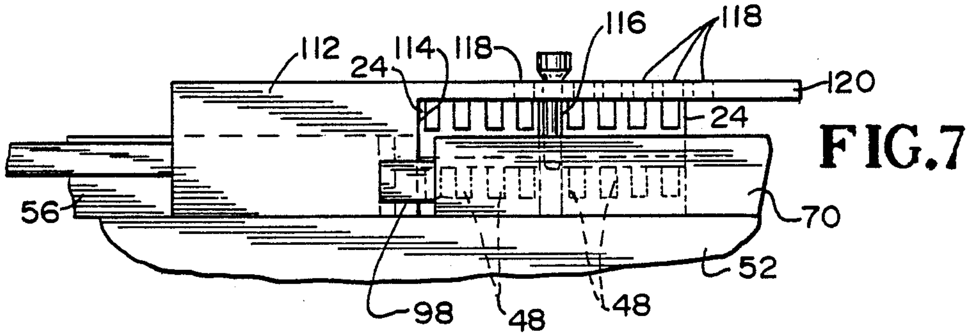
FIG. 7 is an enlarged view of the shuttle taken from the line 7—7 of FIG. 1.

When the transfer carriage 66 reaches the discharge position shown in FIGS. 1, 4 and 6, the pair of connectors 24 in the delivery track 28 are accurately spaced apart the desired distance. During movement to the discharge position, the upper portions of the connectors 24 are received within a shuttle member 112 shown in FIGS. 1 and 7. Shuttle member 112 includes a wall 114 engageable with an end of one of the connectors 24, as well as an adjustable pin 116 engageable with the end of the other connector 24. Pin 116 is mounted in a selected one of a number of pin receiving openings 118 in an upper leg 120 of the shuttle 112. To accommodate connectors of different sizes, a single corresponding one of the openings 118 is selected for mounting the pin 116.

A shuttle drive unit 122 connected by a drive arm 124 to the shuttle 112 is energized to move connectors 24 from the transfer track 72 along the delivery track 28 and into the connector nest 30. The spacing provided by the transfer system 22 is maintained by the wall 114 and pin 116 of shuttle 112. When the connectors are located in the channel 62 of nest 30, the nest 30 is moved by a nest drive unit 126 and drive arm 128 away from the shuttle member 112 and toward the termination station 32 in housing 64. The accurate spacing remains undisturbed since this movement is perpendicular to the direction of the track 28 and channel 62. Thus, the pair of connectors 24 are delivered to the termination station 32 in a precisely spaced relationship with the terminals 42 uniformly spaced in alignment with the termination equipment.

When the transfer carriage 66 returns from the discharge position to the load position, the actuator arm 98 once again engages the cam structure 102. As arm 98 engages the inclined cam surface 104, the pawl member 92 is first moved (to the right as illustrated in the drawings) into the recess 90. Then, as the arm 98 engages the surface 106 and abutment 108, the pawl member 92 is slightly rotated to retract the pawl projection 96 fully into the recess 90. In this position, the transfer track 72 of the transfer carriage 66 is entirely unimpeded and an additional pair of connectors 24 is freely received into the transfer track against the stop pin 82.

Review of Operation

Connectors 24 are supplied from a suitable supply into the feed track 26 where they are continuously biased toward the transfer system 22. The transfer carriage 66 is moved to its load position against stop 78 by the carriage drive unit 74. A pair of connectors 24 is received in the transfer track 72 and the connectors are located by engagement of one of the connectors 24 with the stop pin 82.

Carriage drive unit 74 is operated to move the carriage 66 away from stop 78 and against stop 80. Actuator arm 98 of pawl member 92 moves away from abutment 108 and pawl projection 96 engages a recess 48 of one of the connectors 24. Actuator arm 98 moves away from cam surface 106 and across inclined cam surface 104. The pawl body 94 of member 92 moves into engagement with the abutment wall 110 to separate the two connectors 24 by a precisely determined distance.

In the discharge position of the carriage 66, the precisely spaced connectors 24 are received by shuttle member 112. Shuttle drive unit 122 is operated to move the shuttle member 112 and the spaced apart connectors 24 along the delivery track 28 to the nest 30 as pawl projection 96 is pushed from track 72 by contact with wall 50. Drive unit 126 operates to move nest 30 away from the shuttle member 112 and toward the termination station 30.

When the connectors 24 are clear of the shuttle member 112, the drive unit 122 is operated to retract the shuttle member 112 to its illustrated position. The carriage drive unit 74 is actuated to return the transfer carriage 66 from the discharge position to the load position. As the carriage 66 reaches the load position, actuator arm 98 contacts inclined cam surface 104 to begin cocking of the pawl member 92. The cocking motion is completed when the arm 98 engages the cam surface 106 and then the abutment 108.

After termination of conductors 36 to the terminals 42 of the connectors 24, drive unit 126 can be operated to return the nest 30 to its illustrated position. The cables 44 are then cut off and the ends are notched in the conventional manner for termination of the next pair of connectors 24 to be fed. After cut off of the cables 44, the completed harnesses may be removed from the machine 20 in preparation for the next cycle of operation.

Although the present invention has been described with reference to a preferred embodiment, modifications or changes may be made therein by those skilled in the art. For example, instead of having connector nest 30 directly connected to drive unit 126, connector nest 30 may be fixedly mounted on a movable plate which is in turn actuated by drive unit 126. All such obvious changes may be made herein by those skilled in the art without departing from the scope and spirit of this invention as defined by the appended claims.

We claim:

1. In a harness making machine having a connector feed track in which connectors are supplied in abutting end-to-end relation and a delivery track from which a pair of connectors are fed with their ends spaced apart by a predetermined distance;

an improved connector transfer system for transferring the pair of connectors from said feed track to said delivery track, said connector transfer system comprising:

a carriage member including a connector transfer track for slideably receiving connectors;

means for moving said carriage member alternately to a load position with said transfer track in alignment with the connector feed track and to a discharge position wherein said transfer track is aligned with said delivery track;

a pawl carried by said carriage member adjacent said transfer track; and cam means operable in response to movement of said carriage member from said load position to said discharge position for moving said pawl into engagement with one of the pair of connectors and for moving the one connector said predetermined distance along said transfer track.

2. An improved connector transfer system as claimed in claim 1, further comprising a stop member in said transfer track engageable with connectors received in said transfer track for permitting only said pair of connectors to enter said track.

3. An improved connector transfer system as claimed in claim 2, said stop member being adjustable.

4. An improved connector transfer system as claimed in claim 1, said feed and delivery tracks being generally parallel to one another, and said carriage member being movable in a direction transverse to said feed and delivery tracks.

5. An improved connector transfer system as claimed in claim 1, further comprising a movably mounted pawl member including said pawl, spring means biasing said pawl member to a released position, and said pawl member including a cam follower engageable with said cam means for moving said pawl member to a cocked position.

6. An improved connector transfer system as claimed in claim 5, said pawl being outside of said transfer track in said cocked position and entering said track in said released position.

7. An improved connector transfer system as claimed in claim 6, said pawl member being movable along said transfer track.

8. A harness making machine comprising:

a feed track for supplying connectors in abutting relation;

a delivery track spaced from said feed track;

a transfer structure defining a transfer track;

means for moving the transfer structure between a first position wherein the transfer track is aligned with said feed track and a second position wherein the transfer track is aligned with said delivery track;

separating means responsive to movement of said transfer structure from said first to said second position for separating a pair of connectors in said transfer track, said separating means including cam and follower means and pawl means coupled to said cam and follower means and moveable in said transfer track;

a shuttle for moving separated connectors from said transfer track to said delivery track;

termination means; and means for supplying connectors from said delivery track to said termination means.

9. A harness making machine as claimed in claim 8, said cam and follower means including a cam structure adjacent said feed track and an actuator arm connected to said pawl, said pawl being movably mounted on said transfer structure.

10. A harness making machine as claimed in claim 9, said pawl being mounted for movement relative to said transfer structure in a first direction parallel to said transfer track and a second direction transverse to said transfer track.

* * * * *